Jan. 15, 1935. A. D. TRALLER 1,988,058
DOUGH PACKAGE
Filed April 17, 1933
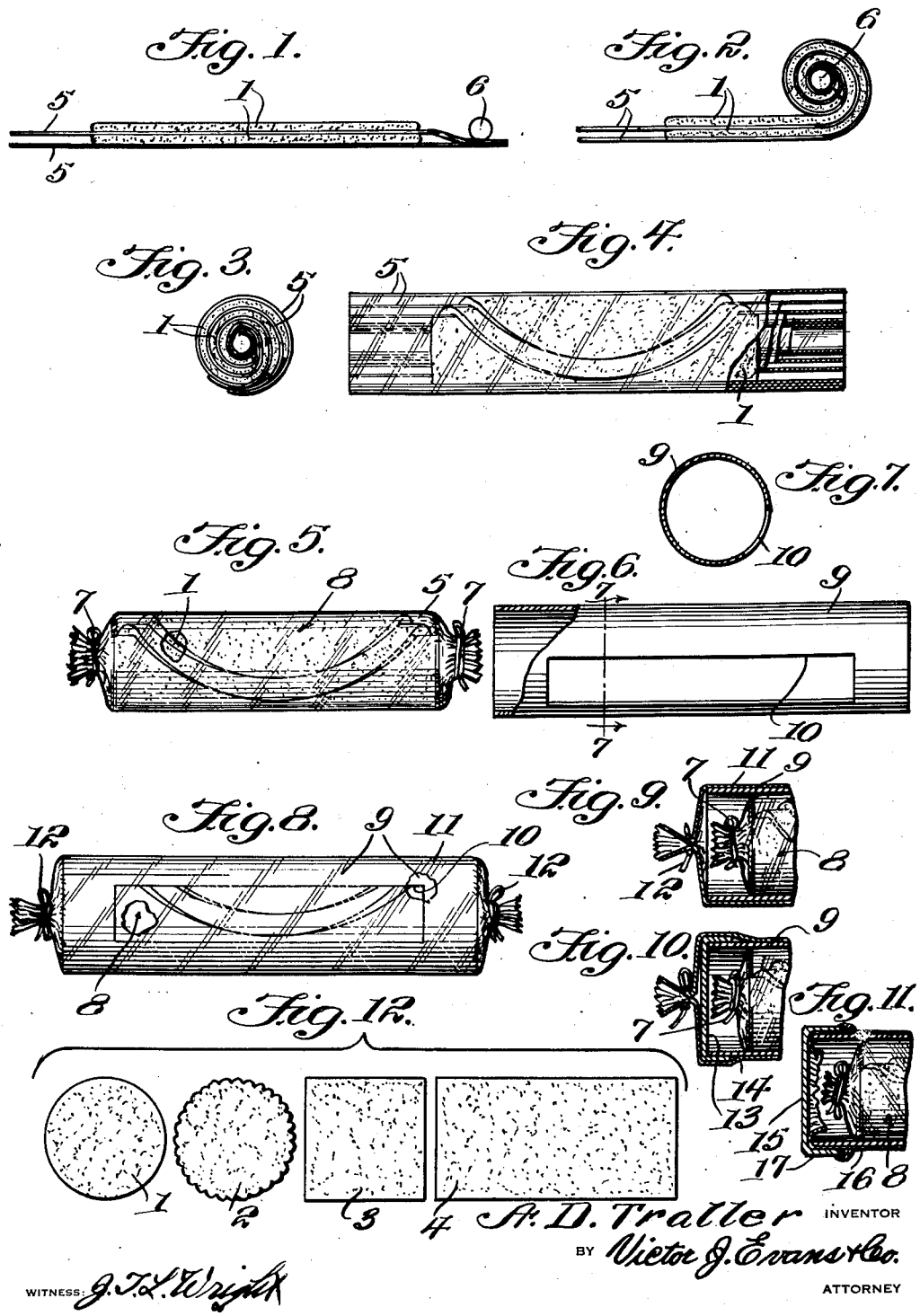
INVENTOR
A. D. Traller
BY Victor J. Evans & Co.
ATTORNEY Patented Jan. 15, 1935

1,988,058

UNITED STATES PATENT OFFICE 1,988,058

DOUGH PACKAGE

Alvord D. Traller, East Saugatuck, Mich.

Application April 17, 1933, Serial No. 666,589

3 Claims. (Cl. 206—46)

This invention relates to preparing and packaging dough for commercial and domestic use, in that the dough is prepared and packed in a sanitary package in a manner whereby it will keep for future use, for a prolonged period of time and can be readily handled and shipped, and sold through stores and the like to the housewife, for the preparation of pastry, biscuits, bread or the like, with the result the trouble of mixing ingredients in providing the dough for the articles mentioned is dispensed with by the housewife.

Another object of the invention is to provide a method and means of packaging dough in a form whereby the latter can be easily and conveniently used in making pies.

A further object of the invention is to provide a package for dough which will retain the latter in shape for making the crusts for pies.

A still further object of the invention is to provide a container that is included in the package, and which is provided with a window or sight opening whereby the contents of the package can be inspected.

A still further object of the invention is to provide a package of the character set forth, that is simple in construction, inexpensive and easy to make, and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a view illustrating one of the steps in preparing my package of dough.

Figure 2 is a similar view of a further step.

Figure 3 is a similar view of the rolling step completed.

Figure 4 is a view taken at right angles to Figure 3.

Figure 5 illustrates the completed roll.

Figure 6 is a view of the container tube of the package.

Figure 7 is a sectional view taken approximately on line 7—7 of Figure 6.

Figure 8 is a view of the completed package.

Figure 9 is a fragmentary sectional view taken through the package with parts in elevation.

Figure 10 is a similar view of a slightly modified form.

Figure 11 is a view of a further modified form.

Figure 12 is a view illustrating the various shapes of the sheets of dough that can be used in my package.

It is to be understood that the dough of my package is prepared and ready for use for baking purposes and is preferably cut in sheets of various shapes and length as shown in Figure 12 and for distinction these sheets are indicated respectively by the reference numerals 1, 2, 3 and 4.

In the form of the packages as shown in the drawing, I prefer to include two sheets of dough which as shown are in the shape as indicated by the reference numeral 1 in Figure 12, but of course any number of sheets may be employed and the sheets may be of any shape. The sheets of dough which are indicated by the reference numeral 1 are superimposed and the lower sheet is disposed upon a sheet 5 of non-adhesive material such as "Cellophane", waxed or other prepared transparent paper and a single sheet 5 is disposed between the sheets of dough, as clearly shown in Figure 1. A guiding element such as a rod 6 or the like is used in rolling the superimposed sheets of dough and sheets 5 as shown in Figure 2, and into a roll as shown in Figure 3. The sheets 5 are considerably longer than the width or diameter of the sheets 1 and therefore the ends of the sheets 5 extend a considerable distance beyond the edges of the sheets 1 as will be noted upon inspection of Figure 4.

The projecting ends of the sheets 5 are crimped and are preferably secured in crimped formation by a flexible element such as a string or the like 7, and adhesive material or wax may be used on the crimped ends to provide an airtight connection in order to prevent the dough from drying, as will be apparent. The sheets 5 are not only wider than the sheets 1, but are longer, so that the sheets 1 do not contact each other, therefore they can be readily separated or removed from the sheets 5.

For distinction, the roll which includes the sheets 1 and 5, with the ends of the latter crimped and secured in an air-tight manner, is indicated by the reference numeral 8, and I provide a rigid container 9 for the roll 8, the container being tubular and preferably formed from cardboard or the like. Arranged longitudinally in the container or tube 9 and preferably for the major portion of its length is an elongated slot 10 which acts in the capacity as a window or sight opening, and the container 9 is substantially co-extensive with the length of the roll 8 or slightly longer as clearly shown in Figure 9.

The roll 8 is of course inserted in the container 9 and the latter is of a size whereby the roll will snugly fit therein, and after the roll is disposed in the container, a sheet 11 of cellophane, waxed paper or like transparent paper is rolled about the container and the ends of the sheet 11 which extend beyond the container is crimped and secured in crimped formation through the instrumentality of a string or the like 12. The crimped ends may be waxed or adhesive material used thereon in order to provide an air-tight connection as will be apparent.

In Figure 10 I have illustrated a slightly modified form of the invention in which I use caps 13 for closing the ends of the container 9, and a sheet of "Cellophane", waxed paper or the like 14 is disposed about the container and the caps, and is secured in the same manner as in the form as shown in Figure 9.

In Figure 11 I have disclosed a further modified form in which caps 15 are used to close the ends of the container which is covered with a sheet 16 of cellophane, waxed paper or the like, and it will be noted that the ends of the sheet 16 extend beyond the ends of the container and are disposed within the container, with the flanges 17 of the caps 15 engaging the sheet 16 to hold the latter taut, as well as the ends thereof within the container as shown. The caps 15 are not only disposed on the ends of the container, but suitable adhesive or sealing means are employed to provide an air-tight connection between the caps and the container.

It will be obvious that the sheet of "Cellophane", waxed paper, or the like that is disposed about the container is transparent and will cover the elongated opening 10, and thereby provide a closed window, so that the contents of the package can be inspected as will be noted from Figure 8, which discloses the edge portions of both of the sheets of dough.

The container can be made from relatively stiff material such as cardboard and the like and of course will protect its contents so that the package in its entirety can be readily handled and shipped without fear of damage thereto.

From the above description and disclosure of the drawings, it will be obvious that I have provided a method and means of packaging raw or leavened dough, in a manner whereby the dough will be preserved in a soft fresh condition for baking upon opening of the package, and the sheet or sheets of the dough can be readily removed in the form packed due to the non-adhesive qualities of the sheets 5, and of course the sheets of dough can be covered with flour or other powdered substance to prevent the same from adhering to the sheets 5.

While I have shown two sheets of dough in a single package I want it understood that one sheet or any number of sheets of dough may be packed in the same manner, but I prefer to pack two sheets of dough, as one of the purposes of the package is for use in making pies which generally have upper and lower crust, however, it will be appreciated that the dough can be used for other purposes such as pastry, biscuits, bread, or the like.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A dough package comprising a roll including sheets of dough between sheets of non-adhesive paper and rolled compactly in a substantially solid cylindrical mass to prevent collapsing, said paper extending beyond the ends of the dough and having the extending portions thereof crimped to close the ends of the roll, a rigid container having the roll snugly arranged therein, and a covering about the container.

2. A dough package comprising a roll including sheets of dough between sheets of non-adhesive transparent paper and rolled compactly in a substantially solid cylindrical mass to prevent collapsing, said paper extending beyond the ends of the dough and the extending portions being crimped to close the ends of the roll, a rigid container having the roll snugly arranged therein and being provided with a window opening, and a transparent covering about the container.

3. A dough package comprising a roll including sheets of dough between sheets of non-adhesive transparent paper and rolled compactly in a substantially solid cylindrical mass to prevent collapsing, said paper extending beyond the ends of the dough and the extending portions being crimped to close the ends of the roll, a rigid container having the roll snugly arranged therein and being provided with a window opening, caps on the ends of the container, and a sealed transparent covering about the container.

ALVORD D. TRALLER.